United States Patent
Brooks et al.

(10) Patent No.: US 8,066,207 B1
(45) Date of Patent: Nov. 29, 2011

(54) METHOD FOR PROCESSING AND ANALYZING CONTAMINATED MIXED WASTE PLASTICS TO PRODUCE REFORMULATED, BLENDED FEED MATERIALS HAVING DESIRED PHYSICAL PROPERTIES

(75) Inventors: Joe G. Brooks, Junction, TX (US); Christopher Lynn Becker, Manhattan, KS (US)

(73) Assignee: Advanced Environmental Recycling Technologies, Inc., Springdale, AK (US)

( * ) Notice: Subject to any disclaimer, the term of this patent is extended or adjusted under 35 U.S.C. 154(b) by 0 days.

(21) Appl. No.: 12/177,015

(22) Filed: Jul. 21, 2008

Related U.S. Application Data

(60) Provisional application No. 60/950,719, filed on Jul. 19, 2007.

(51) Int. Cl.
B02C 17/02 (2006.01)
(52) U.S. Cl. .................................................. 241/24.28
(58) Field of Classification Search ................. 241/24.28
See application file for complete search history.

(56) References Cited

U.S. PATENT DOCUMENTS

| | | |
|---|---|---|
| 3,935,047 A | 1/1976 | Shinomura |
| 4,014,462 A | 3/1977 | Robertson |
| 4,038,219 A | 7/1977 | Boehm et al. |
| 4,071,479 A | 1/1978 | Broyde et al. |
| 4,187,352 A | 2/1980 | Klobbie |
| 4,225,640 A | 9/1980 | Erb |
| 4,379,525 A | 4/1983 | Nowicki et al. |
| 4,968,463 A | 11/1990 | Levasseur |
| 5,075,057 A | 12/1991 | Hoedl |
| 5,082,605 A | 1/1992 | Brooks et al. |
| 5,084,135 A | 1/1992 | Brooks et al. |
| 5,088,910 A | 2/1992 | Goforth et al. |
| 5,096,046 A | 3/1992 | Goforth et al. |
| 5,100,545 A | 3/1992 | Brooks |
| 5,217,655 A | 6/1993 | Schmidt |
| 5,268,074 A | 12/1993 | Brooks et al. |
| 5,277,758 A | 1/1994 | Brooks et al. |
| 5,285,973 A | 2/1994 | Goforth et al. |
| 5,351,895 A | 10/1994 | Brooks et al. |
| 5,503,788 A | 4/1996 | Lazareck et al. |
| 5,540,244 A | 7/1996 | Brooks et al. |
| 5,618,881 A | 4/1997 | Hojabr |
| 5,759,680 A | 6/1998 | Brooks et al. |
| 5,888,910 A | 3/1999 | Park |
| 5,914,353 A | 6/1999 | Grizzle et al. |
| 5,967,435 A | 10/1999 | Lanham |
| 5,972,444 A | 10/1999 | Patel et al. |
| 6,107,400 A | 8/2000 | Mariani et al. |
| 6,149,012 A | 11/2000 | Brooks et al. |

(Continued)

OTHER PUBLICATIONS

W. J. Sichina, DSC as problem solving tool: characterization of consistency of PFA resins, Thermal Analysis, 2000, PerkinElmer Instruments, www.perkinelmer.com.

Beppe Casassa and W. J. Sichina, DSC Isolthermal Crystallization Studies for Better Injection Molding of Polymers, Thermal Analysis, PerkinElmer Instruments.

(Continued)

*Primary Examiner* — Faye Francis
(74) *Attorney, Agent, or Firm* — Locke Lord Bissell & Liddell, LLP

(57) ABSTRACT

A method for reformulating reclaimed, contaminated mixed waste plastics into useful articles wherein a plurality of batches of the mixed waste plastics are preprocessed to produce substantially homogeneous mixtures of a desired particle size range that are characterized according to at least one of their respective plastic content, densities, color and degree of contamination, and are thereafter blended to produce a mixed plastic feed material having properties predetermined to be desirable for reprocessing into at least one of such useful articles.

15 Claims, 12 Drawing Sheets

U.S. PATENT DOCUMENTS

| | | |
|---|---|---|
| 6,228,479 B1 | 5/2001 | Zegler et al. |
| 6,262,133 B1 | 7/2001 | Wisner |
| 6,494,390 B1 | 12/2002 | Khait et al. |
| 6,497,509 B2 | 12/2002 | Merzliakov et al. |
| 6,797,216 B2 | 9/2004 | Furgiuele et al. |
| 6,849,215 B2 | 2/2005 | Khait |
| 6,939,496 B2 | 9/2005 | Maine et al. |
| 6,984,694 B2 | 1/2006 | Blasius, Jr. et al. |
| 7,158,847 B2 | 1/2007 | Ernst et al. |

OTHER PUBLICATIONS

W. J. Sichina, Application of DSC to Injection Molding, Thermal Analysis, 2000, PerkinElmer Instruments, www.perkinelmer.com.

Prediction of End-Use Characteristics of Polyethylene Materials Using Differential Scanning Calorimetry, PerkinElmer Instruments, www.perkinelmer.com.

Use of Differential Scanning Calorimetry in Testing of End-Use Characteristics of Thermoplastics, PerkinElmer Instruments, www.perkinelmer.com.

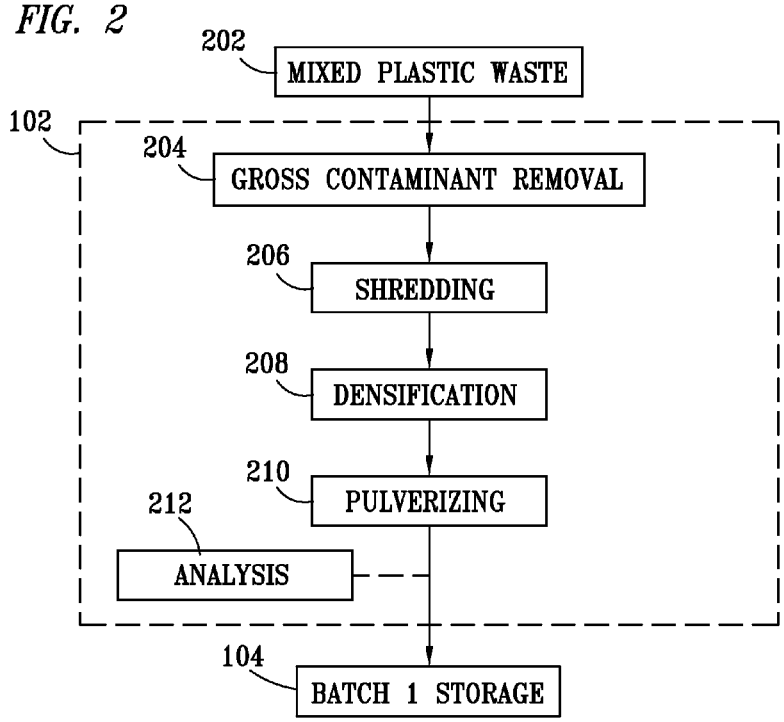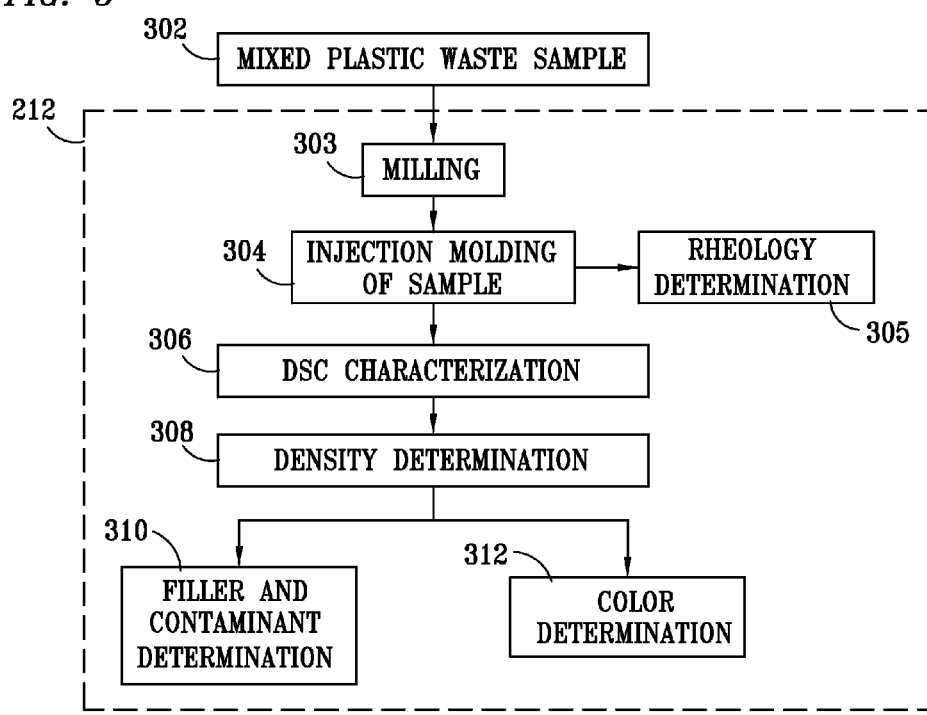

DENSITY CORRELATION FOR THE MEAN TEMPERATURE ON THE DSC FOR LSCBPE (LL AND HD)

METHOD FOR PROCESSING AND ANALYZING CONTAMINATED MIXED WASTE PLASTICS TO PRODUCE REFORMULATED, BLENDED FEED MATERIALS HAVING DESIRED PHYSICAL PROPERTIES

CROSS-REFERENCE TO RELATED APPLICATION

This application incorporates subject matter previously disclosed in U.S. Provisional Application No. 60/950,719, filed Jul. 19, 2007, from which priority is claimed.

BACKGROUND OF THE INVENTION

1. Field of the Invention

This invention relates to methods for reformulating contaminated, mixed plastic wastes to achieve a reclaimed plastic feed material that has properties suitable for use in new products, thereby increasing the value of the resultant recycled plastics. The reformulated materials are desirably produced by preprocessing and analyzing various batches of mixed waste plastics as disclosed herein, and then blending portions of the various batches, each having different plastic contents, physical properties and contaminant levels, to produce reclaimed feed materials for new products. Depending upon the reclaimed wastes that are available and the desired properties of the reformulated mixed waste plastics, the blends can include either reclaimed materials alone, or reclaimed materials in combination with virgin resin. This invention is particularly useful for reformulating mixed waste plastics comprising a significant portion of plastic film.

Another aspect of the invention relates to technology and methods for characterizing and identifying various types of polyethylene that are present, sometimes with polypropylene, in mixed waste plastics from which most of the other polymeric and non-polymeric contaminants have been removed. A further aspect of the invention relates to methods for analyzing and blending mixed waste plastics by taking into consideration the plastic content, density, rheology, filler content, type and level of other contamination, and color or pigmentation.

2. Description of Related Art

The need to reclaim, recycle and reuse waste plastics is well known and is currently at the forefront of public, private and governmental interest. Most plastics are manufactured from petrochemicals, and the current demand for petroleum is at an all-time high in the United States and elsewhere throughout the world. Additionally, many environmental concerns are associated with the handling of waste plastics, primarily due to their slow degradation using conventional waste treatment methods and due to the hazards they present for wildlife.

Mixed waste plastics, and especially those obtained from municipalities, typically comprise many different types of contaminants that must be removed or otherwise dealt with in any effective plastic reclamation process. Such contaminants can include, for example, non-melting fillers, pigments, wood, paper or metal, as well as a variety of plastics that may not be suitable for use as a feed material for the products or process under consideration. Various plastics that may be present in mixed waste plastics, depending upon the source, can include, for example, polyethylene (PE), polypropylene (PP), polystyrene (PS), polyethylene terephthalate (PET), ethylene-vinyl acetate (EVA), polyvinylidene chloride (saran), acrylonitrile butadiene styrene (ABS), and the like.

Even within a particular plastic category such as polyethylene, for example, there are different analogs such as low density (LDPE), linear low density (LLDPE), and high density (HDPE) polyethylene that may have similar densities but functional characteristics that differ significantly. In many cases, reclaimed plastics are manually sorted to segregate the different types of plastics prior to recycling. This can be a very expensive and labor intensive process, and mixed waste plastics are sometimes transported overseas for sorting and classification to permit reuse. Even where the waste originates from a common source and is represented to have substantially the same content from batch to batch, variations in the feed material can require reactive adjustments in manufacturing procedures that cause production losses through increased downtime and substandard products.

The ability to use a higher percentage of mixed waste plastics in the manufacture of new products, including but not limited to composite wood and plastic building materials, is highly desirable. Although many products have been manufactured successfully using scrap or recycled plastics of various types, the variability that exists in the composition and cleanliness of batches of mixed waste plastics obtained over time from either the same or different sources has previously caused serious problems with raw materials processing and manufacturing. The reclamation and reuse of polyethylene film is particularly problematic. In 2005, the U.S. Environmental Protection Agency reported (EPAS530-R-06-011) that less than 3% of all polyethylene film was recycled. Consequently, millions of tons per year of polyethylene film is buried in landfills and never reused. Such film can include, for example, trash bags, shopping bags, bubble wrap, shrink wrap, meat packing wrap, blood bags, and nursery and greenhouse films.

Another problem has recently arisen in the reuse of reclaimed mixed plastics due to the higher filler content of such plastics. As the price of oil and virgin plastic resins rise, plastics manufacturers are incorporating a higher percentage of mineral fillers in the plastics. Consequently, many plastic bags now contain from 15-20% calcium carbonate filler, and widespread filler loadings of up to 30% are predicted. Filler contents can even be pushed as high as 40%, 50% and even 60% where more refined (and expensive) filler particles are used. The increased use of fillers in plastics necessarily impacts the physical properties of those plastics, the associated products, and ability to effectively recycle the resultant mixed waste plastics.

Various analytical methods have been used with in the past to determine the types and properties of plastic present in mixed waste plastics, but with limited success. For example, batches of mixed, reclaimed plastics have been analyzed by pressing a sample of the material between two hot plates at a suitable temperature to form a test plaque, which is then cut up and repressed several more times to make it more homogeneous. Sometimes the polymers present in such test plaques can be determined by visual inspection, although this method is highly inaccurate and only allows for gross distinctions to be made. At other times the samples may contain contaminant inclusions that are not representative of the entire batch and thus can skew the analysis. Other methods believed to have been tried to characterize mixed reclaimed plastics include, for example, melt filtration and solvent extraction. Some prior art patents disclosing inventions relating to reclaiming and reprocessing plastics are, for example, U.S. Pat. Nos. 4,014,462; 4,038,219; 4,071,479; 4,187,352; 4,225,640; 4,379,525; 4,968,463; 5,075,057; 5,217,655;

5,503,788; 5,618,881; 5,888,910; 5,914,353; 5,967,435; 6,107,400; 6,228,479; 6,262,133; 6,797,216; 6,849,215 and 6,984,694.

More recently, the use of differential scanning calorimeters (DSCs) for various purposes has been further described and explained, for example, in various papers published by Perkin Elmer, including the following: Use of Differential Scanning calorimetry in Testing of End-Use Characteristics of Thermoplastics; Prediction of End-Use Characteristics of Polyethylene Materials Using Differential Scanning calorimetry; Application of DSC to Injection Molding; DSC Isothermal Crystallization Studies for Better Injection Molding of Polymers; and DSC as Problem Solving Tool: Characterization of Consistency of PFA Resins.

Notwithstanding recent advances known to those skilled in the art, a need still exists for a reliable and efficient method for characterizing the properties of multiple batches of mixed plastic wastes of varying compositions and for combining them in the amounts needed to produce substantially homogeneous blends of mixed plastics exhibiting specified physical properties within predetermined ranges that are known to be acceptable for use in manufacturing products having desired characteristics.

SUMMARY OF THE INVENTION

The invention disclosed herein enables manufacturers to produce "green" products comprising a high percentage of reclaimed plastics without the need for separating the various components of mixed waste plastics in the manner that has previously been required. Using the methods disclosed herein, manufacturers can now reformulate various batches of mixed waste plastics into feed materials for new products by blending together calculated amounts of various batches that, when combined (either alone or with some portion of virgin resin), yield a feed material having a set of physical properties falling within a desired, predetermined "target window."

Applicant has discovered useful methods for preprocessing, identifying, characterizing and selectively blending various amounts of different batches of mixed waste plastics to produce substantially homogeneous mixtures having physical properties within ranges determined to be suitable, for example, for use in extruding, molding, or otherwise manufacturing, new products. By improving the consistency and reliability of the reclaimed plastic raw material for use in producing new products, significant benefits are achieved through the ability to run a higher percentage of reclaimed plastic with lower associated manufacturing costs, improved product quality and fewer rejects or failures. The need to separate fully the different types of plastics present in various batches of mixed waste plastics prior to reuse is thereby avoided.

Mixed waste plastics can be used more effectively and reliably for producing new products if one determines a "target window" for the melt index and apparent density of the reformulated blends of mixed waste plastics blends produced according to the invention. Density and melt index are prime determinants of other physical properties of an extruded or molded plastic product. One should also understand and appreciate the importance of evaluating the rheological characteristics of reclaimed mixed waste plastic because of the manner in which the rheology can affect the properties and performance of a resultant extruded or molded product. One should also understand and appreciate the need to measure the color and color depth of reclaimed waste plastics to ascertain how much, if any, of a particular batch can be included in a blend intended for use in making another product.

According to one embodiment of the invention, a method is disclosed for preprocessing batches of mixed waste plastics for the purpose of determining their mean densities, plastic content, contaminant content, rheologies, color, color depth, or the like, more conveniently or efficiently, or with greater reliability, than has previously been achievable using known processing methods and analytical techniques.

According to another embodiment of the invention, a method is disclosed for making samples of mixed waste plastics for analytical testing that are more homogeneous than those previously known or used.

According to another embodiment of the invention, a method is disclosed for efficiently and reliably determining how much of various batches of mixed waste plastics should be blended together to produce an extruded or molded plastic product having a desired set of physical properties different from those of any one of the batches.

According to another embodiment of the invention, an efficient and effective method is disclosed for determining the relative amounts of various types of polyethylene and polypropylene that are present in mixed waste plastics after other plastic and non-plastic contaminants have been taken into consideration.

According to another embodiment of the invention, a method is disclosed for inferring the density of a blend of linear short-chained branched polyethylene particles (linear low and high density polyethylene) present in a matrix of other plastics using a differential scanning calorimeter (DSC) or other device capable of relating the melting characteristics of plastics to temperature.

According to another embodiment of the invention, a method is disclosed for inferring the plastic content of recycled linear short-chain branched polyethylene (linear low and high density) using a DSC or other device capable of relating the melting characteristics of plastics to temperature.

According to another embodiment of the invention, a method is disclosed for inferring the plastic content of polymers such as recycled long-chain branched polyethylene (low density) using a DSC or other device capable of relating the melting characteristics of plastics to temperature.

According to another embodiment of the invention, a method is disclosed for determining the blend factors for color for reclaimed mixed waste plastics in the production of composite lumber.

According to another embodiment of the invention, a method is disclosed for determining the rheology of mixed waste plastics for the production of composite lumber.

According to another embodiment of the invention, a method is disclosed for handling mixed waste plastics comprising the steps of shredding the mixed waste plastic, densifying the shredded material to produce agglomerated particles having a bulk density of at least about 16 pounds per cubic foot, pulverizing the densified plastic to a mesh size less than about −10 mesh, transporting the pulverized mixed waste plastic to a bulk storage tank from which it can be blended with other similarly prepared batches to prepare a suitable feed material for an industrial manufacturing process. Final blending of the feed material from portions of various component batches of preprocessed mixed waste plastic is desirably done in a blending silo having internal baffles from which they can be withdrawn at different levels to insure a substantially uniform composition having a desired set of physical properties.

According to another embodiment of the invention, an injection molding machine is used to produce a homogeneous blend of mixed reclaimed plastic, and a DSC or equivalent device is used to characterize the relative amounts of various types of polymers present in the blend. The subject method preferably uses the DSC output to determine the density of a mixed, reclaimed plastic rather than having to separate the various plastics and later recombine them, thereby also reducing energy requirements. By subtraction, the DSC also enables one to determine the amounts of contaminants in individual batches of mixed waste plastics. Once the densities of various batches of reclaimed mixed plastics have been determined, relatively simple algorithms can be used to calculate the amount of various batches of reclaimed plastics that should be combined to produce a blended plastic feed material having a desired density. By using the method of the invention, reclaimed plastic materials can be recombined to produce new products efficiently and with a greatly reduced need for using virgin resin. Although the use of DSC is preferred in the methods of the invention, other devices capable of relating the melting characteristics of plastics to temperature can also be used within the scope of the invention.

According to another embodiment of the invention, a method is disclosed for using DSC data to identify and characterize mixed waste plastics for use in producing quality feedstocks for extruded or molded products such as, for example, composite wood and plastic decking and accessories. The mixed waste plastics used in the method of the invention are understood to have inherently variable plastic contents and physical properties such as, for example, bulk density, color, color depth, rheology, filler content and contamination level.

According to another embodiment of the invention, a method is disclosed wherein mixed waste plastics are characterized or classified according to their respective rheologies as determined from operating parameters of equipment used to process the plastics, such as, for example, the torque or amperage required to rotate a an extruder screw or pump liquefied plastic into an open mold.

According to another embodiment of the invention, plastic articles are disclosed that are manufacturable by extruding or injection molding an inventive feed material comprising mixed waste plastic, wherein the feed material is blended by use of at least one algorithm from batches of substantially homogeneous, partially decontaminated, densified and appropriately sized particles of mixed waste plastic, each batch having been characterized and classified according to at least one of its bulk density, rheology, color, color depth, filler content and contamination.

According to another embodiment of the invention, a method for reprocessing reclaimed mixed waste plastics into useful articles is disclosed wherein a plurality of batches of the mixed waste plastics are preprocessed to produce substantially homogeneous mixtures of a desired particle size range that are characterized according to at least one of their respective plastic content, densities, color, color depth, filler content and degree of contamination, and are thereafter blended to produce a mixed plastic feed material having properties predetermined to be desirable for reprocessing into at least one of such useful articles.

According to another embodiment of the invention, reformulated mixed waste plastics are disclosed that, following preprocessing and analysis as disclosed herein, are blended from various batches of contaminated, mixed waste plastics.

While the inventions disclosed herein are particularly preferred for use in developing reclaimed plastic feed materials for the manufacture of composite wood and plastic decking materials principally comprising PE and PP, it should be understood and appreciated that the methods and products disclosed herein are similarly applicable to other mixed waste plastics, plastic components, and manufactured products.

BRIEF DESCRIPTION OF THE DRAWINGS

The methods of the invention are further described and explained in relation to the following figures of the drawings wherein:

FIG. 2 is a simplified process flow diagram depicting in greater detail than in FIG. 1 the preprocessing of a batch of mixed waste plastic according to a preferred embodiment of the invention;

FIG. 3 is a simplified process flow diagram depicting in greater detail than in FIG. 2 the analysis of preprocessed batches of mixed waste plastic according to a preferred embodiment of the invention;

DESCRIPTION OF THE PREFERRED EMBODIMENTS

Figure 1:
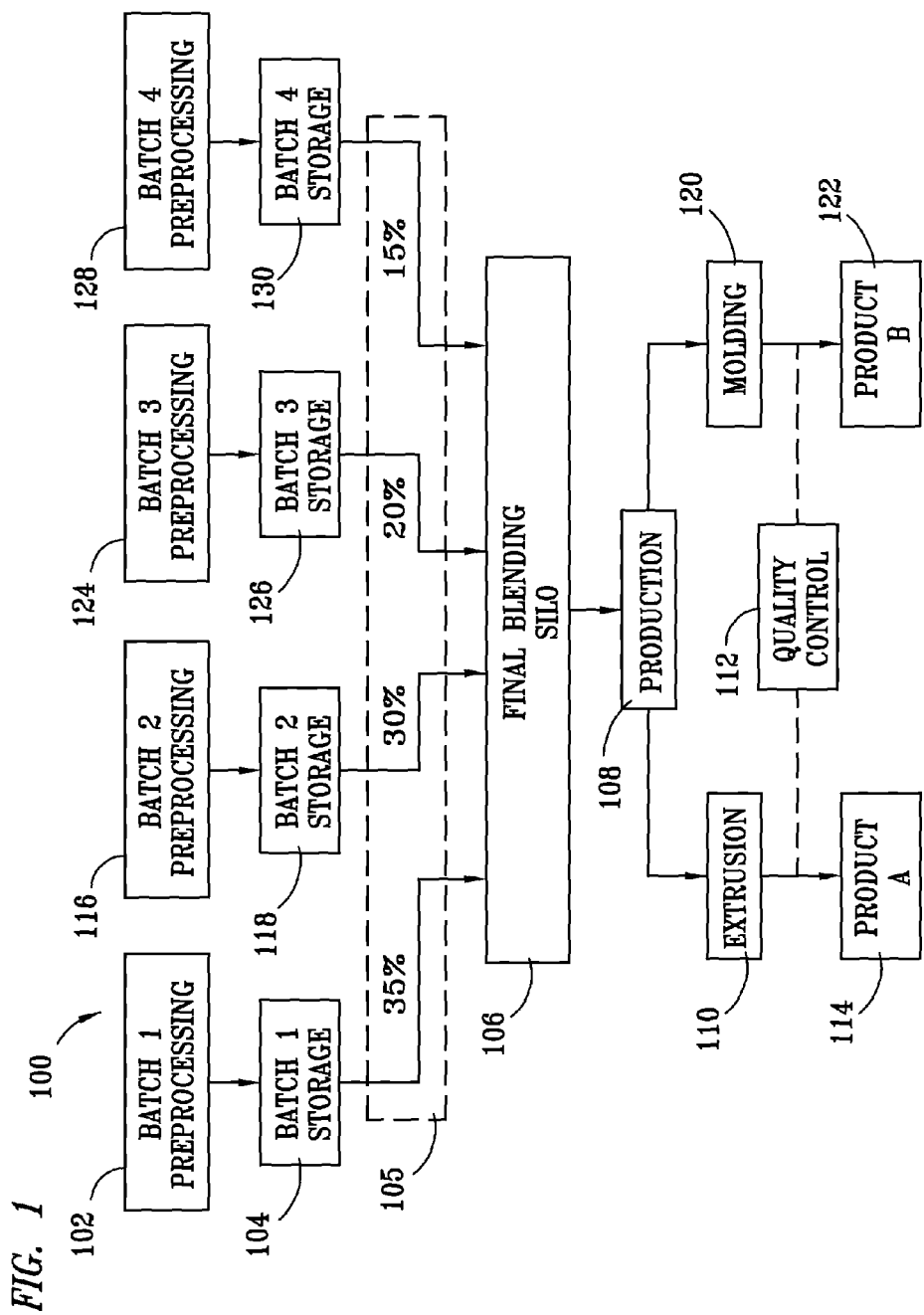
FIG. 1 is a simplified process flow diagram depicting the handling of mixed waste plastics according to a preferred embodiment of the invention from receipt through manufacture into a new finished product.

Referring to FIG. 1, dewatered bales of mixed waste plastics are typically received from various sources by truck or rail car and maintained in stacks pending preprocessing. The preprocessing of batches 1-4 is indicated by blocks 102, 116, 124, 128, respectively. Depending upon the particular source, such bales can comprise different plastic materials, often predominately one type of plastic but with varying amounts of different types of contaminants. In its most general sense, the term "contaminant" can in some contexts include any material other than the type of plastic that is preferred for use in a particular manufacturing operation for which such mixed waste plastic was obtained. For example, mixed waste plastic obtained as scrap from a single industrial supplier may be represented to contain primarily a particular type and form of plastic, or some combination thereof, depending upon the raw materials used by the supplier, but lesser amounts of other plastics or ancillary materials such as paper labels may also be present. By comparison, where the mixed waste plastics are sourced from post-consumer or municipal sources, the types and form of plastics present can be much more varied, and can often include significant quantities of gross contaminants (sometimes referred to as "tramp materials") like rocks, metal, glass, cardboard or the like.

In a more limited sense, the term "contaminant" can also include relatively inexpensive filler materials that are now commonly used to reduce the quantity of plastic that is otherwise required in a product, or to impart a particular physical property that is not present in the plastic alone but that may be desirable in the intended product. Whereas gross contaminants are desirably removed according to the method of the invention, filler materials often cannot be removed without extensive further processing and must therefore be taken into consideration when determining how much of a particular batch of mixed waste plastic can be used as reclaimed material in manufacturing another product. It should also be appreciated that in some cases the filler content or the type of filler are such that the waste plastics containing them cannot effectively used in reformulated blends for some products, in which case such waste plastics are more often used in lower-grade products that are intended to have relatively high filler contents, or those having greater tolerances for such materials.

Table 1 below shows typical physical property ranges and pigment or additive loading of plastic that is reclaimed from various sources:

TABLE 1

| Starting Form | MI Range | Density Range | Pigment Loading | Other Additives, layers, or Copolymers |
|---|---|---|---|---|
| LD Coated Paper | 4-7 | 0.918-.0924 | 0-3.0% | None |
| LLDPE Stretch Film | 2-4 | 0.915-0.920 | 0-3.0% | 0-5% PIB tackifier, 0-3% Color, 0-10% PP or MDPE outer slip layer, mLLDPE skins, Butene or Hexene LL core |
| HDPE T-Shirt Bags | 0.03-0.5 | 0.935-0.950 | 0-6.0% | 0-10% LD added for bubble stability or clarity, 0-20% LLDPE added to lower cost and reduce splitty-ness |
| HDPE HIC Bottles | 0.2-0.5 | 0.940-0.952 | 0-6.0% | 0-0.25% Antistat, 0-10% EVOH oxygen barrier inner layer with ~ 1% adhesive layers on either side. |
| HDPE Milk Jug | 0.45-0.70 | 0.955-0.965 | 0-3.0% | None |
| HDPE Sheet or Corrugated Tote | 0.01-0.70 | 0.945-0.965 | 0-3.0% | 0-.25% Antistat |

Preprocessing

In FIG. 2, "Batch 1 Preprocessing" as identified by block 102 in FIG. 1 is further expanded and explained. First, the bales of mixed plastic waste 202 are cut open and gross contaminants such as strapping or non-plastic contaminants are desirably removed by known conventional means prior to further processing. If left in the plastic, such gross contaminants can easily damage shredder blades or other downstream equipment. The plastic material contained in the bale is then and shredded as disclosed, for example, in U.S. Pat. No. 5,285,973 or using another known shredding device suitable for use with plastics. The shredding operation is represented by block 206 of FIG. 2.

Depending upon the particular source of the mixed waste plastic and upon the particular end use application, it may be desirable in some cases to also separate plastics having specific gravities greater than 1.0 as "gross contaminants" prior to further processing. Various methods and devices using float-sink water separations have previously been disclosed for this purpose, and have also been disclosed for use in cleaning post-consumer plastic film or removing various other contaminants prior to further processing. Some such methods and devices are disclosed, for example, in applicant's own prior patents such as U.S. Pat. Nos. 5,100,545; 5,351,895; and 5,540,244

The shredded plastic is preferably next subjected to densification, an operation identified by block 208, in which the shredded plastic is plastified by the shearing action of rotating cutters and then injected with a coolant to return it to a crystalline structure and thereby agglomerate the plastic as it cools into clumps having a higher bulk density than the loose shredded plastic. A satisfactory method and device for densification are further described and explained, for example, in U.S. Pat. No. 6,149,012.

Following densification, the plastic is desirably pulverized using a rotating arm to break the cooled plastic clumps into small, dense pieces of plastic as indicated by block 210, or otherwise subjected to other similarly effective, commercially available equipment suitable for use in reducing the size of the agglomerated plastic to a desired particle size range. For example, reclaimed polywaste containing LLDPE and HDPE is desirably pulverized between two flat, counter-rotating discs having teeth that grind it to a desired particle size such as, for example, about −10 mesh. Samples of the densified and pulverized mixed waste plastic are desirably withdrawn for analysis as indicated by block 212 of FIG. 2, and the remaining material is desirably moved to intermediate storage as indicated, for example, by block 104 labeled Batch 1 Storage in FIG. 2, in any suitable receptacle or container such as, for example, in large bags, boxes, bins, hoppers or silos.

Analysis

FIG. 3 depicts diagrammatically a preferred analysis procedure for samples obtained for each batch of preprocessed mixed waste plastic as exemplified by blocks 102, 116, 124 and 128 in FIG. 1. Referring to FIG. 3, each mixed waste plastic sample 302 is preferably run through a conventional laboratory knife mill as indicated by block 303 to further reduce the particle size of the densified mixed waste plastic and obtain a more uniform particle size distribution. Both the particle size and the particle size distribution affect the homogeneity of the sample, and experience has demonstrated that bypassing this operation can skew later test results. Most preferably, the laboratory knife mill will reduce the particle size distribution to those particles that will pass through a 2 mm screen.

Applicant has discovered that several advantages not previously appreciated by those of skill in the art are achieved by injection molding samples taken from the preprocessed mixed waste plastic 302 as part of the analytical procedure and testing performed on such samples. Those advantages generally relate to sample homogeneity, rheological properties, and determination of plastic type, density, contaminant level, color and color depth of the various batches of mixed waste plastics. This analytical information can then be used in accordance with the invention to produce new blends containing different amounts of contaminated mixed waste plastics drawn from various batches of reclaimed material, depending upon the type(s) of material and properties needed in products to be manufactured, most often by extrusion or injection molding, using the uniquely formulated blends.

Following milling 303, mixed waste plastic 302 is desirably fed into a bench scale injection molding machine, represented by block 304. Wet samples are preferably dried before placing them in the injection molding machine, or suction can be employed in the throat of the extruder screw in the molding machine to remove excess moisture. Larger particles require more extruder backpressure to cause more agitation, while smaller particles need less backpressure to assure complete mixing.

The injection molding machine produces samples having a degree of homogeneity that is believed to be important for purposes of conducting the various analyses and characterization studies discussed herein and obtaining results that are representative of the batch, which results are subsequently relied upon for determining the percentages of various batches of mixed waste plastics to be blended as discussed later below. Hydraulically driven injection molding machines are preferably used to create a substantially homogeneous mixture from a mixed waste plastic sample. Such machines are resistant to failure due to contamination that is present in a sample, and provides multiple readings per sample. The total time required to homogenize and collect rheological data for a particular sample is generally less than about 5 minutes. The injection molding machine is desirably configured to selectively mold either samples that fit properly in the pan of a DSC or "dog bones" suitable for use in subsequent tensile testing.

Another benefit obtained by injection molding test samples is a reduction in the time required for downstream testing of the samples. Typically, a DSC sample is heated to the point that all the plastic is melted, and is then cooled at a controlled rate to measure the heat flux. This is because the DSC results are subject to the heat and stress history of the sample, i.e., identical materials processed differently will have a different memory and a different DSC scan. The use of an injection molding machine as indicated by block 304 eliminates the need to "heat treat" the DSC sample in the DSC. Use of the injection molding machine to prepare samples gives all samples going to the DSC an identical heat history, thereby eliminating the necessity of the annealing step. This reduction in the number of heating and cooling cycles during testing triples the effective output of the DSC. Because of the high degree of homogeneity obtained in injection molding samples made from mixed plastic particles having a carefully controlled size and size distribution, the samples are also useful for reliably determining the contamination level, color and color depth of the mixed plastic.

Referring to block 305 of FIG. 3, it is also believed that by monitoring, recording and analyzing data obtainable from the injection molding machine such as, for example, the amperage drawn by an electric motor turning the mixing extruder screw, the torque required to turn the screw in a hydraulically driven machine, or the pressure required to inject the sample into the molds, valuable insight can be gained into the rheology or heat history of a particular sample in relation to other samples of the same or a similar mixed waste plastic material. The injection pressure and torque correlate with the melt index, which is also a good indicator of the rheology of a plastic material.

Following injection molding of test pieces as indicated by block 304 and collection of data from which rheology of the homogeneous mixed waste plastic sample can be evaluated as indicated by block 305, appropriately sized samples are desirably placed in a DSC for further characterization, as indicated by block 306. The use of 15 milligram samples measuring 0.25 inch diameter by 0.005 inch thick are preferred. The DSC measures the heat uptake or flux as the machine raises the temperature of the sample at a fixed rate.

Figure 4:
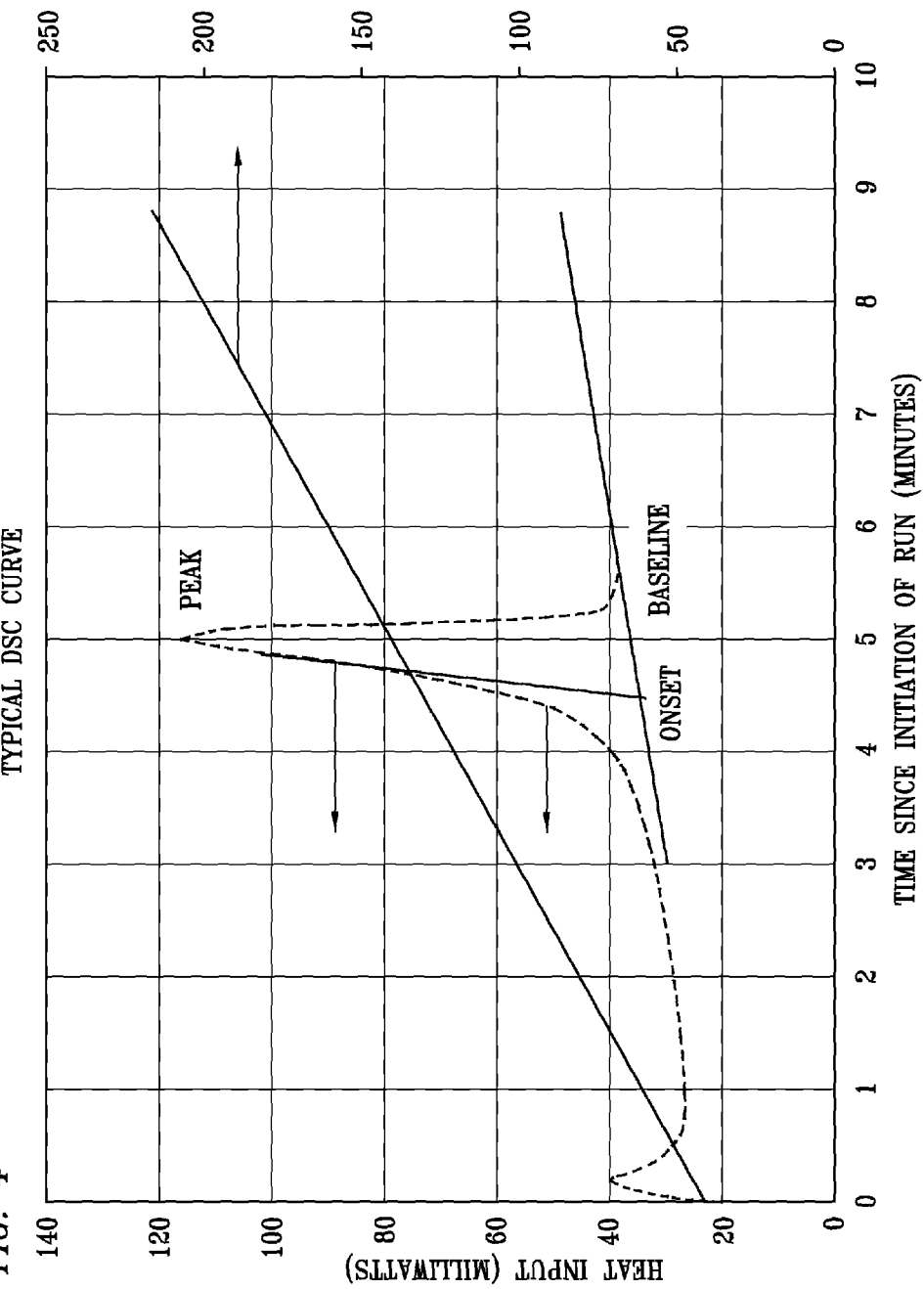
FIG. 4 is an illustrative DSC scan of heat input versus time.
Figure 5:
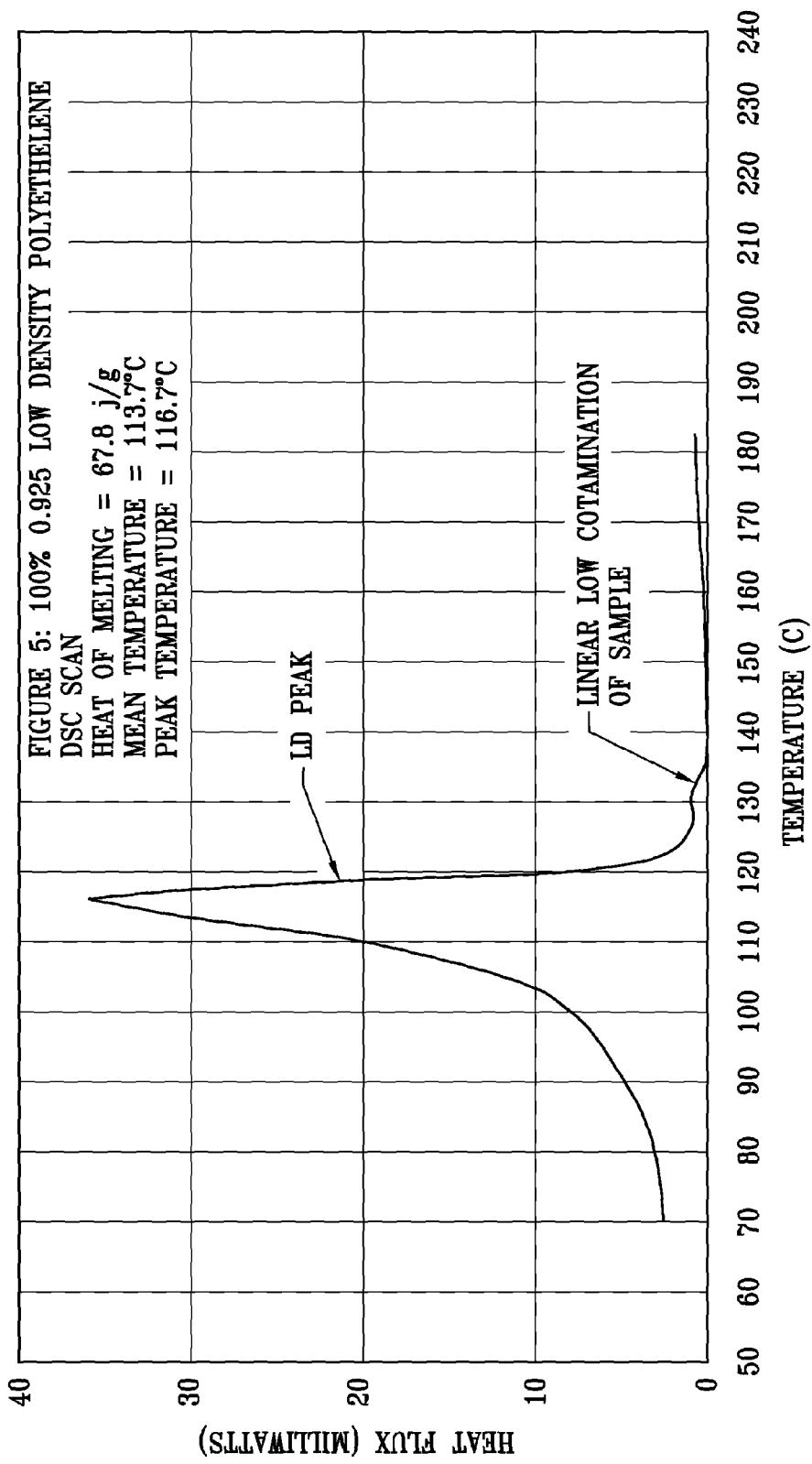
FIG. 5 is a graph showing the heat flux versus mean temperature.
Figure 6:
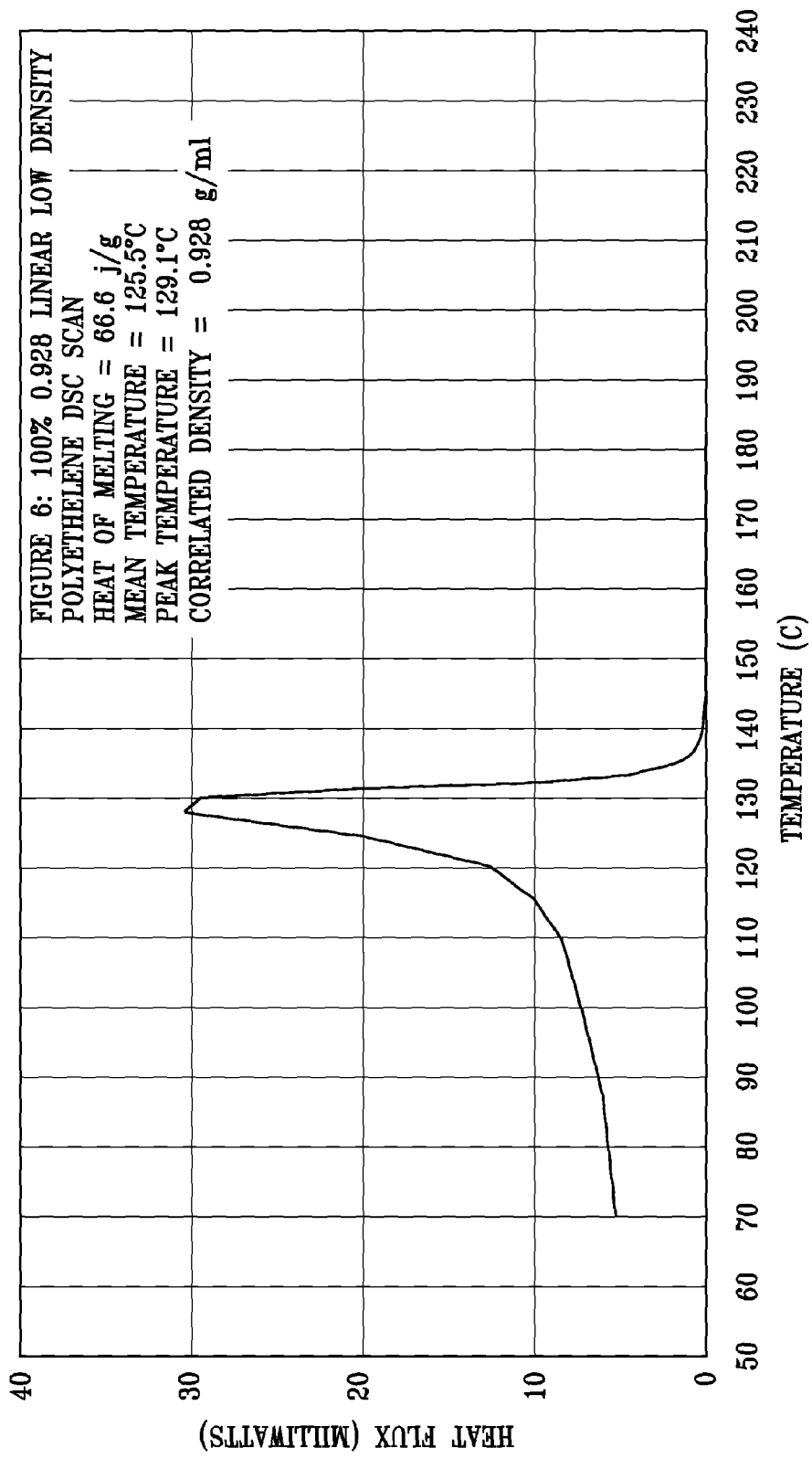
FIG. 6 is an illustrative DSC scan for 100% linear low density (0.928) polyethylene.
Figure 7:
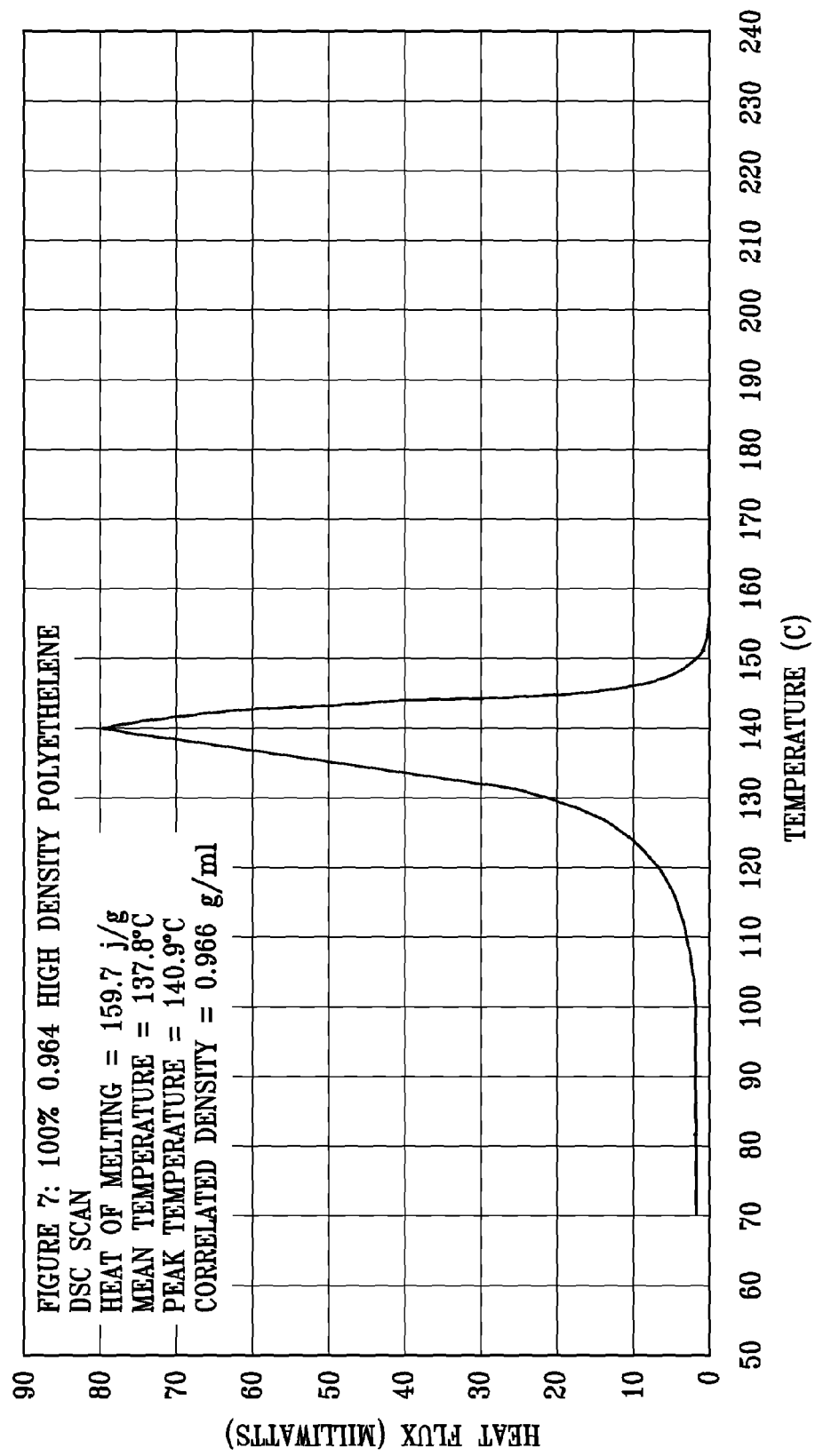
FIG. 7 is an illustrative DSC scan for 100% high density (0.964) polyethylene.
Figure 8:
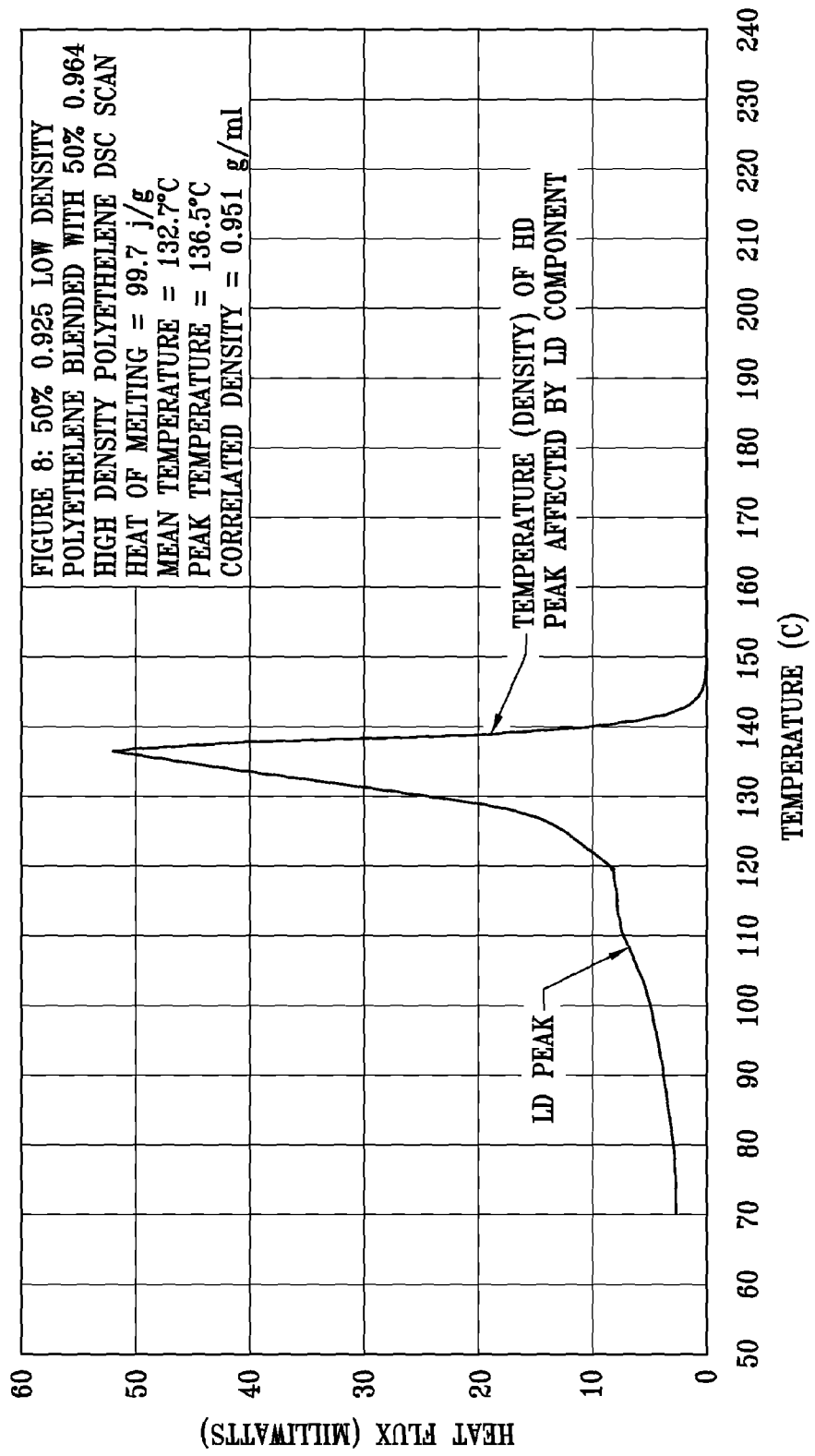
FIG. 8 is an illustrative DSC scan for 50% low density (0.925) polyethylene blended with 50% high density (0.964) polyethylene.
Figure 9:
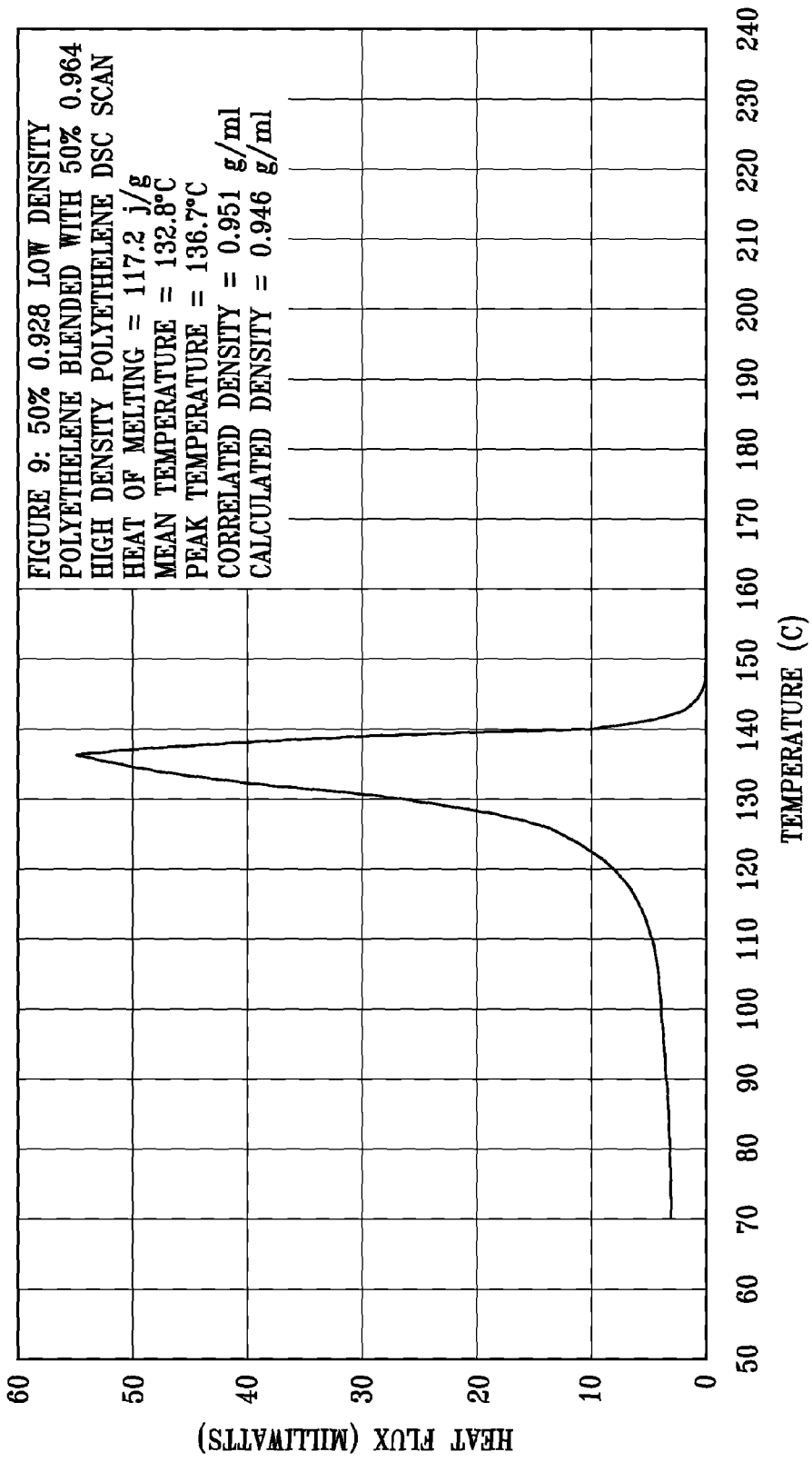
FIG. 9 is an illustrative DSC scan for 50% low density (0.928) polyethylene blended with 50% high density (0.964) polyethylene.
Figure 10:
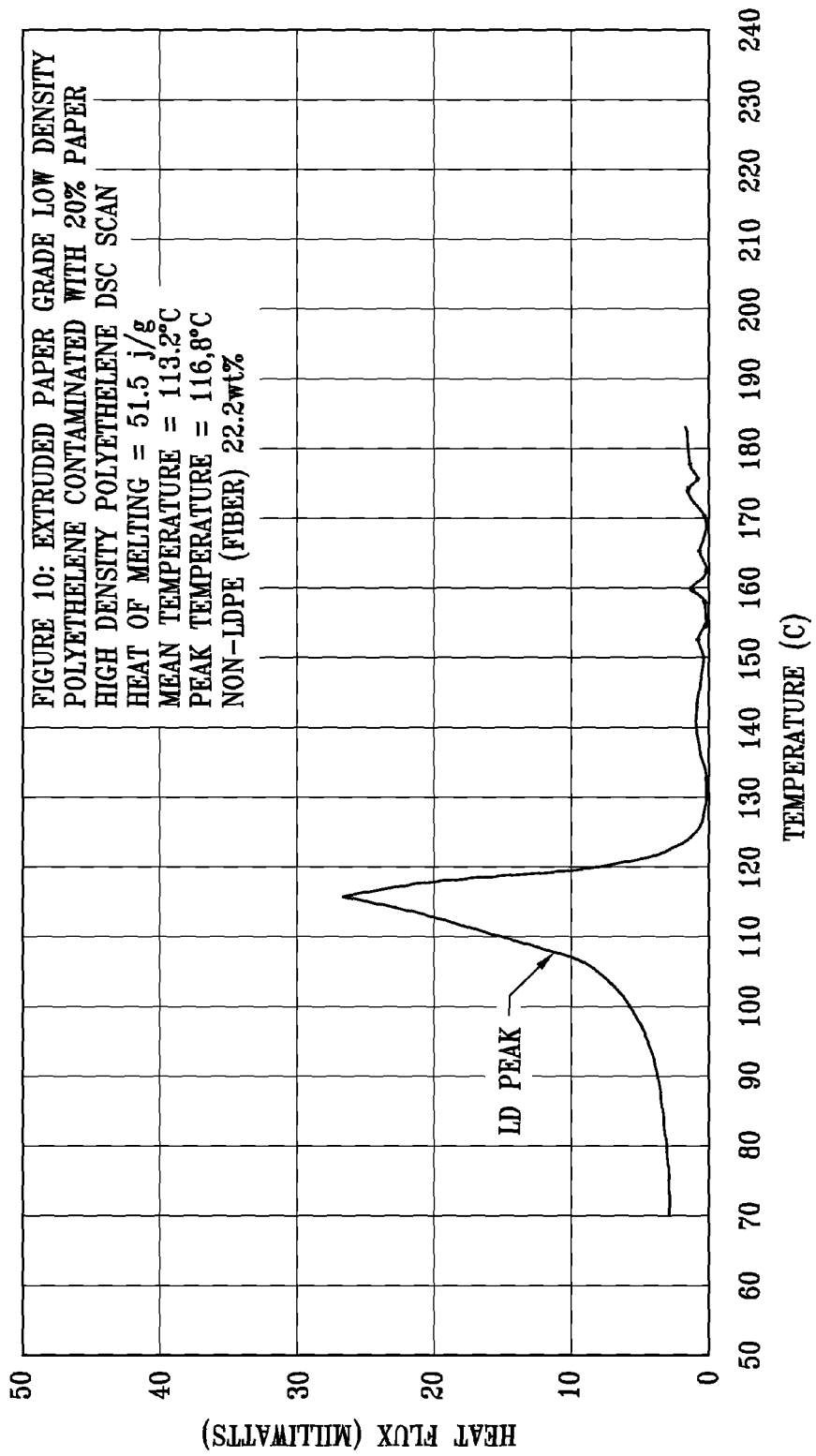
FIG. 10 is an illustrative DSC scan for extruded paper-grade low density polyethylene (contaminated with 20% paper) with high density polyethylene.

Referring to block 308 of FIG. 3, it is known that the melting temperature and density of thermoplastic polymers are related. It is also known that the area under the flux curve represents the amount of heat required to melt the plastic. FIG. 4 depicts a graph generated by a DSC of heat input, or heat flux, over time. FIGS. 5-10 depict graphs generated by a DSC of heat flux versus temperature for various polymers that may be found in mixed waste plastics, and show the heat of melting, mean temperature and peak temperature (temperature at which maximum heat flux occurs) for each polymer.

At the melting point, the heat flux increases because the material goes through a phase transition. For pure plastics, this flux effect appears as a spike on a graph of temperature versus heat flux that is generated by the apparatus. For mixtures, this flux effect appears as a smooth curve. The curve represents the melting behavior of the plastic, since more heat is needed for the phase transition. Said differently, this curve can be used to determine, at least roughly, the amount of plastic that melts at the given temperature. If the type of plastic is known (by measuring the melting temperature), then the heat flux as determined from a DSC curve plotting heat input versus temperature can also be used to identify the plastic content. Further, the quantification of those peaks is related to the density and plastic content of the plastics of interest that are contained in the mixed waste plastic sample.

In the past, a plastometer was used, together with gravimetric methods, to determine the density of a plastic material. Such a technique is not adequate or effective for use with reclaimed plastics having a high level of variations or contamination (especially, high filler content) because of problems such as plugging. By using data such as that obtained from an instrument or analysis as performed by the DSC with samples that have been preprocessed and homogenized as disclosed herein, however, one is able to graph more reliably the heat of melting as a function of mean temperature.

Figure 11:
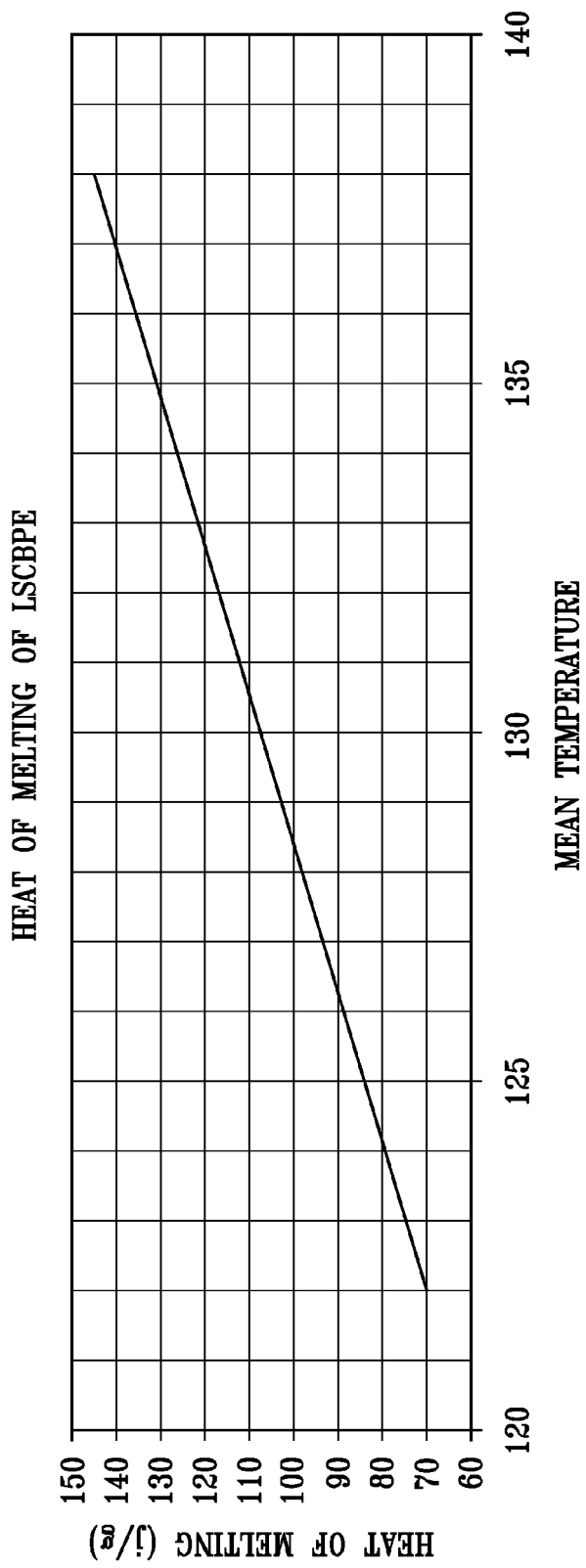
FIG. 11 is a graph showing the heat of melting vs. mean temperature for linear short-chain branched polyethylene.
Figure 12:
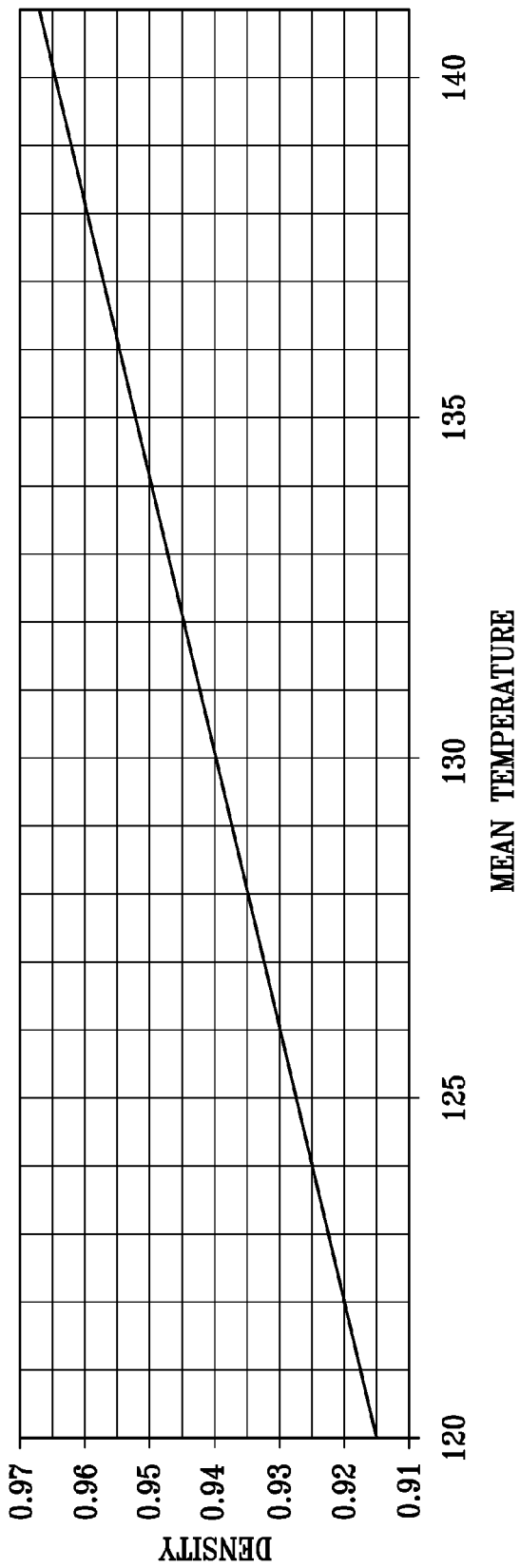
FIG. 12 is a graph showing the density correlation (density vs. mean temperature) for linear short-chain branched polyethylene.

Using the analysis of the invention, a mixed waste plastic sample that has been preprocessed, sized and homogenized as described above can be placed in a DSC, and the resultant information as disclosed, for example, in FIGS. 4-10 can be used to better characterize the waste plastic. By analyzing the mean temperature obtained from the DSC flux curve in relation to the heat absorbed (determined by integrating the area under the flux curve), one is able to produce a graph of heat of melting vs. mean temperature as shown in FIG. 11, and the apparent density correlation for the mean temperature, as shown in FIG. 12. From this information, one can produce a graph of the melt index vs. apparent density that can be used to define a "target window" for a new, reformulated blend, as shown for example in FIG. 13.

Referring to block 310 of FIG. 3, once the type and amount(s) of plastic have been determined using a DSC, the level of contaminants in the mixed waste plastic sample can be determined by difference. The mean melting temperature/density correlation works well for contaminated plastic because the contaminants are inert within those temperature ranges. The contaminants simply lower the heat needed to melt the plastic, and do not change the melting temperature.

It also should be understood and appreciated by those of skill in the art upon reading this disclosure that, although the use of a DSC is preferred for determining density, other similarly effective apparatus can be employed to measure the amount of heat (flux) required to increase the temperature of a sample at a fixed rate.

In addition to considerations relating to the type and amount of various plastics that are present in a particular mixed plastic waste sample 302, color and color depth are important considerations in determining how much of any particular batch of mixed waste plastic can be used to produce a manufactured product. For example, the presence of even a small of amount of some pigments can produce color effects in products that are more significant than greater amounts of one or more other pigments if used in the same product. Referring to block 312 of FIG. 3, it is believed that color can be more reliably measured using a plaque made from the sample mixed waste plastic material that has been homogeneously mixed in the injection molding machine as discussed above in relation to block 304. The plaque is desirably scanned with a spectrophotometer, taking at least four color readings, at least three of which are taken at three points equidistant from each other and approximately one inch from the middle of the plaque, forming an equilateral triangle in the center of the plaque. The color readings are then averaged and both the average and the range of readings for the plaque are recorded. To determine color depth, the pigment density is determined by using a correlation graph giving the color shift from white or black versus measured L., a. or b.

During the blending process as discussed below, depending upon the color levels in the batches of mixed waste plastic, and depending upon the requirements of the intended product, various types or amounts of pigments may be added to the blend to modify the color of the resultant manufactured product.

Blending

Referring again to FIG. 1, once each batch of preprocessed mixed waste plastic has been analyzed, a blend calculation is desirably performed in order to determine how much of each of various batches of preprocessed mixed waste plastic should be combined to produce a blend having properties suitable for use in making a new product, either alone or when further blended with additional virgin resin. In FIG. 1, the blend calculation is indicated by dashed block 105 that includes for illustrative purposes preprocessed mixed waste plastic taken from four batches 104, 118, 126 and 130, although the number of batches used can be fewer or greater as needed to achieve a desired final blend. In this case, the relative percentages of the various batches calculated for use in the final blend is 35%, 30%, 20% and 15%, respectively.

Figure 13:
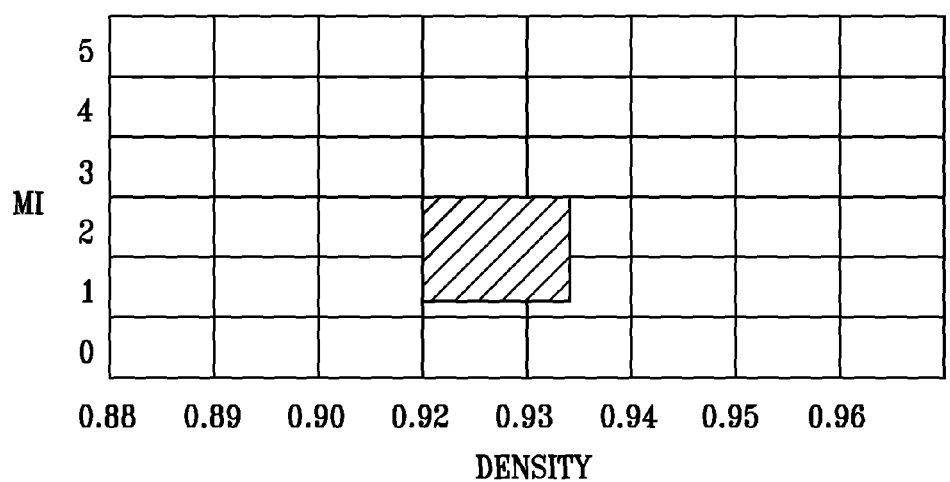
FIG. 13 is a graph of melt index vs. density for mixed waste plastics preprocessed, characterized and blended in accordance with the invention that depicts an illustrative target range for such blends when used to make a particular product, in this case an extruded ⅝-inch composite wood fiber and plastic deck board for use on 16-inch joist centers.

A principal objective of blending is to achieve a blended feed material having a melt index and density that fall within a desired range that has been determined to be satisfactory for use in making a desired product. Referring to FIG. 13, for example, a chart is shown in which a target "window" identified by cross-hatching identifies mixed plastic material having a density ranging between about 1.3 and 3, and a melt index ranging between about 0.92 and 0.93, as being acceptable for use. In the illustrative situation depicted in FIG. 1, such a feed material is presumably achieved by using the indicated percentages of each respective batch as determined in a blend calculation as indicated by dashed block 105.

From the pertinent analytical data, a blending table can be produced that uses the measured density of different blend components to calculate a stable mixture of plastic. Note, for example, that if one defines the density of HDPE (0.96) and the density of LLDPE (0.92), a mathematical formula can be developed that expresses the percentage LLDPE in a mixture as a function of density. This is important for identifying the economic value of a mixture, since HDPE and LLDPE have distinctly different incremental values. This is also the mechanism (calculation of % LLDPE) used to predict the appropriate blend recipe for use in manufacturing a new product. Simple algebraic formulas can be used for the calculations.

Similarly, a spreadsheet can be prepared and used to calculate a correlated density using input obtained from the DSC. In one such case, for example, the spreadsheet can correlate density and fiber content for a material where the mixed waste plastic also contains cellulosic fiber. This uses the methods described above. The spreadsheet uses finite element integration, with the calculations done by software. The data flow is as follows:

instrument to instrument computer
instrument computer to raw data file
raw data file into Excel on an analysis computer
print and data retention on analysis computer
backup of instrument and analysis computer A formulation sheet can then be prepared and used to set the final blend formulation for a new product. Such a sheet desirably includes the calculated weight fraction of each raw material component, usually but not necessarily including portions of multiple different batches of mixed waste plastics, sometimes in combination with or more virgin resins, pigments, or the like.

To mix viscosities we can sum the weight fraction divided by the component viscosity. Blend viscosities can be calculated by the formula:

$$1/\eta = \psi_1/\eta_1 + \psi_2/\eta_2 + \psi_3/\eta_3 + \ldots \psi_\eta/\eta_\eta$$

where $\psi$ is the weight of a specific component and q is the viscosity. Because the melt index (MI) is inversely related to the viscosity, the same calculation can be done for melt index blends using the following:

$$MI = \psi_1 MI_1 + \psi_2 MI_2 + \psi_3 MI_3 + \ldots + \psi_\eta MI_\eta$$

For a known blend ratio, the melt index for the blend can be calculated using the above function. An optimization routine is desirably used to modify the blend ratio (within identified constraints) to control the MI. This can be done using an Excel spreadsheet where one can enter a target MI for a finished blend of up to 5 components of known MI and density, and the upper and lower constraints on the percentage of each component in the final blend, the spreadsheet will allow you to adjust the percentage of each component and see the effect various blend percentages will have on the MI and Density of the final blend. Alternatively, logarithmic averaging can be used.

Situations will occur where the desired MI and density range cannot be reached due to the content and quality of the raw material available, and the upper and lower constrains placed on the percentage of each component in the blend. In such cases, the use of a higher percentage of virgin resin is required in order to achieve the desired blend properties.

Desirably, one will identify a "typical" product for each feed stream and perform viscosity testing over our desired processing temperature window to generate the viscosity vs. temperature curves. The blend viscosity can then be calculated from the individual curves, along with the weight fraction of each component to be included in the blend. In addition, the viscosity vs. temperature curves for the individual components and being able to generate one for the blend are a useful tool when concerns arise concerning the performance of blend, extrusion line, or a particular die.

Thus, the general approach is to generate "apparent" MI, density and contamination values on incoming raw materials, perform blending where possible to improve uniformity, then retest blended material to confirm quality of the blended component. Lab test values are considered to be "apparent" due to the effects of contaminants over which there is little control (e.g., fiber content of hydro-pulp, pigment content of scrap films, dust or other contamination). Using these "apparent" values of the components to calculate the related values of the final blend will result in some degree of error and only experience will enable one to build a correlation between the "apparent" values calculated for a blend and the performance of these blends in extrusion. For example, higher MI, lower contamination, and lower density can each contribute to lower mixing times during commercial production of composite decking boards, and can potentially lower board strength in break testing. Levels of LLDPE higher than 45% can result in board break values dropping below desired minimums.

Referring again to FIG. 1, once a desired blend formulation is calculated by any suitable means, whether or not utilizing data or correlations obtained using a DSC, the desired quantities of various batches of preprocessed mixed waste plastics and, optionally, virgin resin, are introduced into suitable mixing apparatus whereby the different components are physically blended to obtain a substantially homogeneous mixture. A preferred apparatus for use in such blending is represented by block 106 in FIG. 1. Reducing the particle size of the densified, reclaimed plastic to a desired size such as −10 mesh promotes thorough blending to achieve a more uniform feed material for sample analysis and for the related manufacturing process. However, because similarly sized particles of different plastics still have different densities, a blending silo containing internal baffles is desirably used to insure thorough mixing of each batch of reclaimed plastic feed material and reduce the density stratification that otherwise occurs during handling and storage.

Production of New Products

Once a suitable blend of reclaimed mixed waste plastic has been prepared according to the procedures described above, the blended material is transported to production equipment as generally identified by block 108 in FIG. 1 for the manufacture of new products. Most often, the manufacturing processes involve extrusion 110, molding 120, or other processes known to those of skill in the art for forming thermoplastics to produce resultant products as indicated for illustrative purposes as Product A and Product B in blocks 114, 122, respectively. It should be understood, however, that this diagrammatic representation is not intended to suggest that a particular blend is necessarily satisfactory for use in either an extruded or molded product, but simply as a suggestion that an appropriate blend of mixed waste plastics prepared as described herein can be used as a feed material for extrusion and/or for molding operations. As with any manufacturing operation, it is understood that production samples are withdrawn for inspection and testing pursuant to whatever quality control standards are in place, as represented diagrammatically by block 112 in FIG. 1.

Particular Uses of DSC in Determining Blends for Composite Wood Products

Presented below for further illustrative purposes is a further discussion of considerations particularly relating to mixtures of reclaimed mixed waste plastic containing LDPE, LLDPE, HDPE and hydropulp waste consisting primarily of LDPE and cellulosic fiber, where the resultant blends are principally intended for use in producing extruded wood and plastic composite decking boards.

Linear low density and high density polyethylene (LLDPE and HDPE) are particularly preferred for use in manufacturing extruded composite wood fiber and plastic building materials. By incorporating a relatively minor amount, such as from about 3 to about 15 weight percent, of HDPE into the blended polywaste increases the Young's modulus of the plastic and makes the resultant extruded building products stiffer. Each such product has a target density that is directly related to the relative amounts of LLDPE and HDPE in the plastic feed material. There is a correlation, for example, between the density of LLDPE/HDPE phase and its melting point. This is consistent with physics, as a more dense material has shorter inter-molecular bond lengths, and therefore (given the same carbon/hydrogen ratio) higher energy bonds, which take a higher temperature to break. The correlation of density of the LDPE phase is not nearly as wide (and therefore, less predictable). However, the melting temperature is also dependent upon the type of LDPE present, and not just not its density.

By analyzing and recombining varying amounts from various bales and batches of reclaimed plastic according to the process of the invention, one is able to provide approximately the same amounts of LLDPE and HDPE in the feed material for the related manufacturing process, thereby achieving the desired target density and making the resultant end product more consistent, without the need for adding virgin resin.

As mentioned above, the present invention preferably involves the use of a DSC to characterize the relative amounts of various types of polypropylene and contaminants in recycled plastics. A DSC measures the amount of heat or flux required to increase the temperature of a sample at a fixed rate. At the sample's melting point, the flux increases because the material goes through a phase transition. For pure materials, this flux increase is a spike. For mixtures, the flux increase is a smooth curve. The melting temperature and the density of polyethylene are related. The mean melting temperature can be determined from the flux curve measured by DSC. This mean melting temperature can be used to determine the density of the plastic. Any contaminants present in the plastic do not affect this density determination because the contaminants are inert. While contaminants lower the amount of heat needed to melt the plastic, they do not affect the melting temperature.

Once the type of plastic is known from its melting temperature, the amount of heat required to melt the sample can be used to measure the amount of the plastic present and by difference the amount of contaminant present in the sample. Further, the DSC scan allows the various contaminants such as polypropylene, nylon, and EVA polyethylene to be identified and quantified. It is more difficult, although still useful, to use DSC to measure the amount of contaminants in HDPE because the relatively low contaminant levels result in signals that can be less than the current fluctuations resulting from environmental errors.

The DSC raises the temperature of the sample and the sample pan at a fixed rate, and measures the amount of heat required to do so. Crystalline solids such as, for example, an indium reference sample, will produce a very narrow peak with a half width of about 1.5 degrees. Because the reclaimed plastic is not completely crystalline, it has a statistical distribution of bond strengths, and when it melts, produces a half width of about 10-20 degrees, with HDPE exhibiting a narrower width, for example, than LDPE. Mixed plastics provide multiple peaks, one for each plastic type, with the amount of heat absorbed by the plastic being proportional to the amount of that plastic in the sample, as demonstrated by the area under each peak of a DSC curve plotting heat flux against temperature. Because LLDPE and HDPE are mutually soluble, a DSC curve for a mixed plastic comprising only those two plastics will be a smooth curve with a single peak.

Determining the Apparent Density of a Blend of LSCBPE Present in a Matrix of Other Plastics Using a DSC In order to make high quality composite lumber or other manufactured products with either broader or narrower "target windows" of desirable physical property parameters, it is necessary to control the density of the plastic phase of the composite. If known virgin materials are used, the average density of this component can be controlled by measuring the density of the feedstocks using standard gravimetric methods, and utilizing varying quantities different density materials to adjust the final density.

However, there are economic advantages to using recycled and reprocessed plastic from post industrial and post consumer waste streams, such as grocery bag collectors at grocery stores, recycled bottles from municipal collection systems, stretch film from warehouse activities, etc. The difficulty with these streams is that they contain contaminants, such as metal, wood, pigment, and fillers, that prevent the measurement of the density of the underlying plastic components using gravimetric methods. This inhibits, but does not prevent, their use as the plastic component in composite lumber. The effect of their use is that the quality of the boards varies because the density of the underlying plastic cannot be accurately controlled.

It is important for DSC operation that the sample have a reproducible "heat history". "Heat history" is the thermal/shear history of the sample since the last time it was melted. Because plastic is a combination of amorphous and crystalline phases, it changes properties over time due to continued crystallization of the amorphous phase. In most DSC literature, they run the sample through a melting and recrystallization step in the DSC machine itself in order to make the sample results reproducible, which takes a significant amount of time (20+ minutes). The injection molder process described above makes the "heat history" the same for all samples, and therefore the heatup/recrystallization step normally utilized is not necessary. If there are particles of a size greater than the one half the thickness of the plaque that do not melt (paper, polypropylene, nylon, dirt, etc) in the sample, the sample must be ground before it is homogenized/plaqued in order for a representative amount of those material to end up in the sample.

A typical DSC curve is shown in FIG. 4. This curve was generated by starting at a temperature of 40° C., and increasing the temperature at a rate of 20° C./min. The peak in the curve represents the melting of the polyethylene in the sample. The baseline variation seen from 6-8 minutes represents non-polyethylene components of the plastic, including polypropylene and nylon.

It is necessary to characterize the temperature at which the polyethylene melts. There are several different methods of doing so:
1) Determine the peak temperature of the sample analysis. This method suffers from the problem that at middle densities, the peak temperature does not change predictably with density. This method does work, advantageously, at both ends of the density spectrum due to the fact that there is less interference with the other types of plastic, just not in the middle.
2) Determine the mean temperature of the sample analysis. This method gives good results for all densities when only the LSCBPE is present. However, when Low Density Random Branched Polyethylene(LDRBPE) is present, this test is not effective at lower LSCBPE densities.

$$MeanTemp = \frac{\int T(q(T) - qbaseline)dT}{\int (q(T) - qbaseline)dT}$$

where:
qbaseline=the linear baseline of the sample, had melting not occurred.
T=the sample temperature(the x-axis of the curve).
q(T)=the heat adsorbed by the sample(the y-axis of the curve).
3) Determine the onset temperature. This is the temperature at which a line drawn tangent to the first inflection point of the curve crosses the baseline. This method does not do a good job in the middle of the density range, and has the difficulty associated with interference from other plastic, affecting the results. Finally, this method is more difficult to execute using a computer than the mean temperature calculation.

We have determined a density correlation with a mean temperature using a graph such as that depicted, for example, in FIG. 12. We use the results of the results of the density measurements to:
1) Make blends of consistent material to minimize variation of the extrusion facilities to optimize the production of good quality boards. (Densities are linearly additive in these density ranges.)
2) Proactively adjust the extrusion facilities to adjust to the changed materials.

Determining the Plastic Content of a Blend of LSCBPE Present in a Matrix of Other Plastics Using a DSC In order to make high quality composite lumber (or other products as discussed above), it is necessary to accurately control the plastic content of the composite. If known virgin materials are used, this factor can be controlled using standard blending methods, and utilizing varying quantities different known materials to adjust the final plastic content.

Linear short chain branched polyethylene is a primary component of the PE wood composites. High raw material prices have encouraged virgin resin users(film, bag, and bottle makers) to use fillers, such as talc (ground calcium carbonate) to extend the resin, as well as to adjust the final product performance. When these items are recycled, various types of material are blended together, giving a material of a variable plastic content. We have also found that the plastic content of the mixed waste plastic can be determined using a DSC. Because the impurities do not have melting points that coincide with the LSCBPE, and the heat adsorbed by the plastic is directly related to the amount of plastic in the sample, we can estimate the plastic content of a known type of plastic from the thermal characteristics measured by the DSC. The heat of melting for LSCBPE can be correlated to the characteristic temperature and density of the plastic sample.

The DSC measures the amount of heat necessary to increase the sample over a range of temperatures. There are at least two common methods of doing this, which are described in the literature, and both methods are applicable. The higher speed, low mass sample cup method is preferable, though, because it allows faster cycle times, increasing the utilization of the machine and faster turnaround of the data, and increases the resolution of the heat adsorbed vs. temperature curve as shown in FIG. 4.

The peak temperature, mean temperature and onset temperature are determined as described above in the discussion relating to inferring the density in a similar blend. For the purpose of this test, it is necessary to characterize the heat absorbed by the sample during melting. One way of doing this is to measure the peak height from the baseline. The peak height is characteristic of the heat of melting for LSCBPE. However, this method is less reproducible than others because the peak height is subject to sample preparation and loading errors, as well as fundamental variations in the viscosity and thermal conductivity of the plastic. Because the heating method is dynamic, the peak can be attenuated by these factors.

The heat flux is preferably integrated through a fixed temperature range that is dependent upon the shape and position of the curve. This method is used because it gives a reproducible representation of the amount of plastic in the sample, is much less sensitive to sample preparation and surface contact in the sample pan, and sample conductivity characteristics.

The standard heat of melting of the LSCBPE plastic in the sample is determined from a graph of the heat of melting versus mean temperature as shown in FIG. 11. Then the LSCBPE plastic content of the sample is calculated using the following formula:

$$LSCBPEPlasticContent = \frac{q_{sample}}{q_{std}}$$

$$q = \int (q(T) - q_{baseline}) dT$$

where:
$q_{sample} \Rightarrow q$ calculated for the analyzed sample.
$q_{std} \Rightarrow q$ calculated from the correlation with mean temperature.
$q_{baseline}$=the linear baseline of the sample, had melting not occurred.
T=the sample temperature(the x-axis of the curve).
$q(T)$=the heat adsorbed by the sample(the y-axis of the curve).

The results of the plastic content measurement to calculate and make blends of consistent material to minimize variation of the extrusion facilities, to proactively adjust the extrusion facilities to adjust to the changed materials, and to select raw materials to prevent over-addition of potentially bad raw materials, such as talc. Similarly, one can use a process similar to that described above to identify and quantify impurities such as nylon and polypropylene in recycled plastics, and to control the compositions of those impurities in the composite to make consistent quality boards or other products.

Determining the Plastic Content of a Blend of LCBPE (LDPE) Present in a Matrix of Other Plastics Using a DSC Polywaste (pulped laminate film from cupstock) primarily consists of long chain branched polyethylene (LCBPE), also called low density polyethylene (LDPE). This component is the biggest plastic content variable for a manufacturer of composites (or other products) using this material. Because of the way it is produced, the material can vary from 5-50% paper, making its efficient use difficult.

We have found that the plastic content of the mixed waste plastic can be determined using a differential scanning calorimeter, which is a device that determines the thermal characteristics of a small sample. Because the impurities do not have melting points that coincide with the LDPE, and the heat adsorbed by the plastic is directly related to the amount of plastic in the sample, we can estimate the plastic content of a known type of plastic from the thermal characteristics measured by the DSC. Sample preparation for use of this method is preferably like that described above.

The plastic content of the sample is calculated using the following formula:

$$LDPEPlasticContent = \frac{q_{sample}}{q_{std}}$$

$$q = \int (q(T) - q_{baseline}) dT$$

where:
$q_{sample} \Rightarrow q$ calculated for the analyzed sample.
$q_{std} \Rightarrow q$ calculated for a pure standard extrusion coating grade LDPE.
$q_{baseline}$=the linear baseline of the sample, had melting not occurred.
T=the sample temperature(the x-axis of the curve).
$q(T)$=the heat adsorbed by the sample(the y-axis of the curve).

Note that the content of other meltable impurities(polypropylene, nylon, etc.) can be determined using this same mechanism.

Determination of the Blend Factors for Color for Recycled Plastic in the Production of Composite Lumber In order to make high quality composite lumber (or other product as discussed above), it sometimes necessary to accurately control the color of the composite. If known virgin materials are used, the colors of the feedstocks can be controlled and the color of the resulting composites can be accurately controlled. With reclaimed mixed plastic waste, however, the colors of these components, as they are received, are highly variable. This inhibits, but does not prevent, their use as the plastic component in composite lumber. The effect of their use is that, without careful attention, the color of the resultant boards can vary significantly.

We have found that the color contribution to the composite of the component plastic can be characterized by measuring a thoroughly homogenized sample of the plastic, and measuring its color parameters with a reflectance spectrophotometer. Further, more useful, information can be obtained by mixing small known amounts of known pigments (black and white) with the material prior to homogenization, with subsequent homogenization, and color analysis. Measuring and correlating the results of such test allow us to predict the effects of their raw material on the subsequent composite board color (which may be pigmented). It is believed that the use of prior known methods that did not thoroughly homogenize the samples would yield unforeseeable results due to small particles of highly pigmented plastic.

A preferred procedure is as follows:

A. Homogenize the Sample, and Create Uniform, Predictable Thickness Plaque

Process the material in a melt/mixing/extrusion device to homogenize the mixture, which could be Preferably, an injection molder.

An extruder, with subsequent chipping using a heated platen press.

A batch mixing device, with subsequent chipping using a heated platen press.

A heated roll mill (a 2 or 3 roll mill) consisting of a heated rollers which squeeze and fold melted plastic between the rollers multiple times.

The chips must be thick enough to not transmit light, and must have a uniform, flat, consistent texture surface. It is critical that the sample be homogenized during this step. Typical recycled plastic is made up of a physical mixture of 1/64"-1/8" densified or ground granules of various density, color, and Melt indices of plastics. It is important that the chip be representative distribution of the particles in the sample, and that all of the meltable plastic is dispersed. The mechanisms listed above liquefy the plastic, makes a homogeneous mixture, and then cools them at a reproducible rate, making very small plastic grains (much like metal grains) that are much smaller than the size of the color sample. This effect makes the sample disc representative of the bulk material.

If there are particles of a size that causes the surface of the plastic to be of a variable color, the sample must be ground before it is homogenized.

B. Analyze the material with a spectrophotometer

The L. a. b. values are used industrially to characterize color. Record the L. a. b.

C. Determine the color "density" for L. a. b.

This will be determined from a calibration curve, and will be dependent upon the source of material (grocery, stretch film, hydropulp).

For tests done using know pigment background, the results are independent of the source of material.

The color density will be used as weighting factors for blend calculations. The results of the results of the color measurements can thereby be used to make blends of consistent material to minimize variation of the extrusion facilities. Proactively adjusting pigment additions at the extrusion facilities enables manufacturers to adjust to the changing, but now known, raw materials.

Determination of the Rheology of Recycled Plastic for the Production of Composite Lumber In order to make high quality composite lumber (or other products as discussed above), it is sometimes necessary to accurately control the rheology of the plastic components of the composite. If known virgin materials are used, the rheology of the feedstocks can be controlled and therefore, the rheology of the resulting composites can be accurately controlled. However, when using mixed waste plastics, the rheology of these components are highly variable. This inhibits, but does not prevent, their use as the plastic component in composite lumber. The effect of their use is that the extruders must deal with a variable feedstock, leading to inconsistent quality boards. Standard test for measuring the rheology of plastic are not effective for characterizing the rheology of recycled materials because of the presence of impurities. Those impurities clog the nozzles used for these purposes, and provide highly inconsistent results. The inconsistency of the particles is also a serious issue.

We have found that measuring the injection pressure, and the screw torque on an injection molder or standard extruder when processing the samples enables the determination of the rheology of the underlying plastic, particularly when this test is coupled with other independent test where the contamination level is determined. The results from this test can be correlated with the standard MI test for each type of plastic, and/or can be used directly without correlation to control the extrusion process.

This test is less susceptible to inaccuracies caused by the presence of impurities, and can measure the rheological properties at a temperatures typical of extrusion operations, yielding more representative data. The standard MI tests are run at temperatures well above the normal composite lumber processing temperatures.

The procedure is as follows:

A. Ensure that the sample is processable in an injection molder

The particle size of the sample must be small enough to pass through the screw of the molder without plugging.

B. Run enough material through the molder to purge any previous sample

Set the injection molder temperature to the expected extrusion temperature. Set the injection molder to inject at a constant rate.

C. Record the injection pressure and the screw torque for the sample.

D. Using a calibration curve, and the type of plastic, infer the melt index from results of the pressure and the torque.

E. Alternatively, define rheology indices of the material as 1/injection pressure and 1/screw torque, and use those indices for blend calculations.

Use the results of the results of the rheology measurement to:

3) Make blends of consistent material to minimize variation of the extrusion facilities.

Proactively adjust the extrusion facilities to adjust to the changed materials.

Representative Blending Data for Polyethylene for Use in Extruded Composite Plastic and Lumber Products Example 1

| | Density | MI |
|---|---|---|
| LDPE off spec resin | .92 | 4 |
| LDPE linear board poly densified | .924 | 2 |
| LLDPE Stretch densified | .918 | 3 |
| HDPE KW Pellet | .95 | .5 |
| HDPE Grocery Bags | .94 | .8 |

| | % | MI | Density | MI Comp. | Density Comp. |
|---|---|---|---|---|---|
| HDPE | 10 | .4 | .95 | .4 | .095 |
| LLDPE | 40 | 2.5 | .918 | 1.0 | .367 |
| LDPE linear board | 50 | 2 | .924 | 1.0 | .462 |
| | | | | 2.4 | 9.24 |

Example 2

|  | MI Density | MI | Density | Comp. |
|---|---|---|---|---|
| 15% milk jug flake | .4-.945 | .06 | .14 |  |
| 45% LDPE polywaste | 2 | .924 | .90 | .416 |
| 40% LLDPE | 2 | .918 | .80 | .367 |
|  |  |  | MI | Density |
| Final Average |  |  | 1.76 | .9227 |

Example 3

| MI DENSITY CALCULATOR: POLYMER | PERCENT | Lot No.: MELT INDEX | MI COMP | Date: DENSITY | DEN COMP |
|---|---|---|---|---|---|
| LDPE | 23.50 | 4.00 | 0.94 | 0.925 | 0.217 |
| LLDPE | 43.30 | 2.00 | 0.87 | 0.918 | 0.397 |
| HDPE | 13.60 | 0.50 | 0.07 | 0.924 | 0.129 |
| LDPE or all Hydropulp | 19.60 | 2-4* | 0.39 |  | 0.181 |
| OTHER | 0.00 |  | 0.00 |  | 0.000 |
| FINAL BLEND | 100.00 |  | 2.26 |  | 0.925 |
| ACCEPTABLE BLENDS |  |  |  |  |  |
| LDPE RANGE | 0.00-0.80 | 1.0-6.0 |  | 0.917-0.925 |  |
| LLDPE RANGE | 0.00-0.80 | 0.5-3.0 |  | 0.915-0.945 |  |
| HDPE RANGE | 0.10-0.40 | 0.1-1.0 |  | 0.945-0.968 |  |
| FINAL BLEND RANGE | 100 | — | 1.5-2.5 | — | 0.920-0.930 |

INSTRUCTIONS: Enter MI and Density data from lab reports then adjust percentages of each product until the final blend is 100.00% then the MI and Density of the final blend are shown under the MI Comp and Den Comp columns.
*Depends on cupstock or foodboard The above descriptions of certain embodiments are made for the purpose of illustration only and are not intended to be limiting in any manner. Other alterations and modifications of the preferred embodiment will become apparent to those of ordinary skill in the art upon reading this disclosure, and it is intended that the scope of the invention disclosed herein be limited only by the broadest interpretation of the appended claims to which the inventors are legally entitled.

What is claimed is:

1. A method for processing, analyzing and characterizing each of a plurality of different batches of contaminated reclaimed mixed waste plastic for use in blending reformulated feed materials having at least one identified physical property falling within a predetermined acceptable range and from which useful products can subsequently be manufactured, the method comprising:
   preprocessing each of the plurality of different batches of contaminated, reclaimed mixed waste plastic by removing gross contaminants, shredding the resultant product, densifying the shredded mixed waste plastic to at least about 16 pounds per cubic foot, and pulverizing the densified mixed waste plastic to a predetermined maximum particle size of about −10 mesh;
   selecting a sample from each of the plurality of batches of preprocessed mixed waste plastic;
   further reducing the particle size of the sample to obtain a more uniform particle size distribution;
   injection molding each sample to produce a substantially homogeneous composition from the mixed waste plastics within that sample; and
   analyzing at least a portion of each substantially homogeneous injection molded sample to characterize and determine at least one physical property of that sample.

2. The method of claim 1 wherein each batch of mixed waste plastic is densified by agglomerating the shredded mixed waste plastic.

3. The method of claim 2 wherein a coolant spray is used in agglomerating the shredded mixed waste plastic.

4. The method of claim 1 wherein each sample of preprocessed mixed plastic waste is reduced to a particle size distribution wherein the particles will pass through a 2 mm screen.

5. The method of claim 1 wherein at least a portion of each substantially homogeneous injection molded sample is analyzed using a differential scanning calorimeter.

6. The method of claim 5 wherein at least a portion of each substantially homogeneous injection molded sample is analyzed to determine an apparent density of the mixed waste plastic.

7. The method of claim 5 wherein at least a portion of each substantially homogeneous injection molded sample is analyzed to determine a plastic content of the mixed waste plastic.

8. The method of claim 5 wherein at least a portion of each substantially homogeneous injection molded sample is analyzed to determine a level of contaminants.

9. The method of claim 5 wherein at least a portion of each substantially homogeneous injection molded sample is analyzed to determine a level of color.

10. The method of claim 5 wherein at least a portion of each substantially homogeneous injection molded sample is analyzed to determine a depth of color.

11. The method of claim 1, further comprising determining an acceptable range for the at least one physical property analyzed for a particular sample.

12. The method of claim 11, further comprising determining in what proportions the plurality of different batches of preprocessed mixed plastic waste should be blended in achieving a reformulated feed material having the at least one physical property within the acceptable range.

13. The method of claim 12, further comprising blending the determined proportions of the plurality of different batches of preprocessed mixed plastic waste in achieving a reformulated feed material having the at least one physical property within the acceptable range.

14. The method of claim 13 wherein a minor portion of virgin plastic is blended together with the determined proportions of the plurality of different batches of preprocessed mixed plastic waste in achieving a reformulated feed material having the at least one physical property within the acceptable range.

15. The method of claim 13 wherein blending is done under conditions that promote thorough mixing.

* * * * *